United States Patent [19]
Snodgrass et al.

[11] 3,789,497
[45] Feb. 5, 1974

[54] METHOD OF PRODUCING COMPOSITE METAL ARTICLE

[75] Inventors: Robert H. Snodgrass, Massena, N.Y.; James R. Carter, Bath, Maine; Carl M. Edstrom, Massena, N.Y.

[73] Assignee: Aluminum Company of America, Pittsburgh, Pa.

[22] Filed: Sept. 29, 1972

[21] Appl. No.: 293,486

[52] U.S. Cl.............. 29/453, 29/470.6, 29/472.3, 29/473.7, 29/482
[51] Int. Cl............................................. B23p 11/02
[58] Field of Search . 29/473.3, 470.5, 470.6, 472.3, 29/473.7, 474.3, 475, 480, 482, 453

[56] References Cited
UNITED STATES PATENTS

| | | | |
|---|---|---|---|
| 543,192 | 7/1895 | Rodig | 29/470.5 |
| 2,154,942 | 4/1939 | Karmazin | 29/470.5 |
| 2,797,448 | 7/1957 | Revell et al. | 29/453 |
| 3,054,176 | 9/1962 | Beneke | 29/473.3 X |

Primary Examiner—Richard B. Lazarus
Attorney, Agent, or Firm—Carl R. Lippert

[57] ABSTRACT

A composite metal body is produced using a metal cladding and metal core with longitudinal dovetail-wedge or diamond shaped tongue and groove means for interlocking engagement, rolling the assembly to effect interlocking, and further rolling the assembly to metallurgically bond the cladding to the core.

20 Claims, 6 Drawing Figures

Patented Feb. 5, 1974

METHOD OF PRODUCING COMPOSITE METAL ARTICLE

BACKGROUND OF THE INVENTION

Composite metal products, particularly composite aluminum alloy products, are currently employed in a number of forms including bar, rod, wire and the like which are useful in a number of applications. Typically an aluminum composite features a comparatively strong core alloy coated with a corrosion resistant cladding alloy. An example is aluminum screen door wire.

In the production of such composites typical operations include roll bonding to produce a rolled intermediate product which can then be further worked as by drawing to form a drawn wire product. In the initial preparation of a composite material the cladding alloy must be securely attached to the core alloy to withstand the initial roll bonding operations so as to assure good roll bonding and freedom from manufacturing problems which can increase production costs.

Several methods are known in connection with attaching the cladding material to the core. One involves casting the cladding alloy around an ingot or billet of the core material. Another contemplates welding the cladding material to form a sheath around the core. These techniques are obviously expensive and often have technical disadvantages. For instance, welding introduces an additional alloy, the weld metal, and the welds sometimes crack in the rolling mill. Other methods contemplate the frictional fitting of the cladding material around the core but these can introduce slippage problems in the rolling mill.

DESCRIPTION

In accordance with the present invention, many of the problems in initially bonding a cladding material to a core are alleviated in a reliable and inexpensive fashion. In general terms the invention contemplates providing dovetail-wedge, or diamond shaped, tongue and groove means to provide interlocking engagement between the core and cladding. Engagement is effected by snap fitting in a rolling mill. The tongue portion is characterized by a cross-section having two diverging sides which join two converging sides, thereby providing an undercut wedge or dovetail-wedge shape which facilitates relatively easy insertion into and positive engagement with the mating groove. The groove exhibits diverging and converging sides to mate with the tongue and facilitate a tight snap positive engagement between the respective members. After engagement of the two members, the assembly can be heated and rolled to effect a metallurgical bond between the members and reduce the cross-section to a desired size and shape. The thus-formed clad body, typically a round rod, can then be drawn down into wire in the conventional manner.

The invention will now be described with reference to the accompanying drawings wherein.

Figure 1:
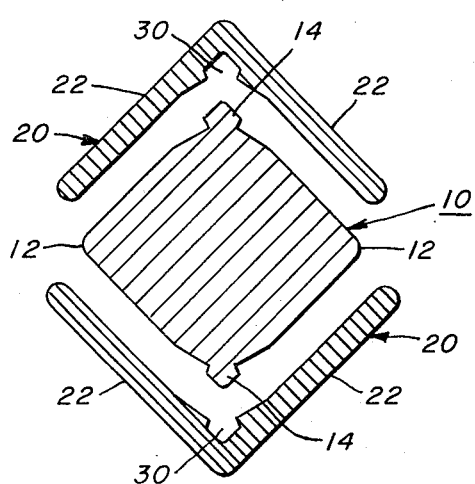
FIG. 1 is a cross-sectional elevation showing core and cladding members before engagement.
Figure 1A:
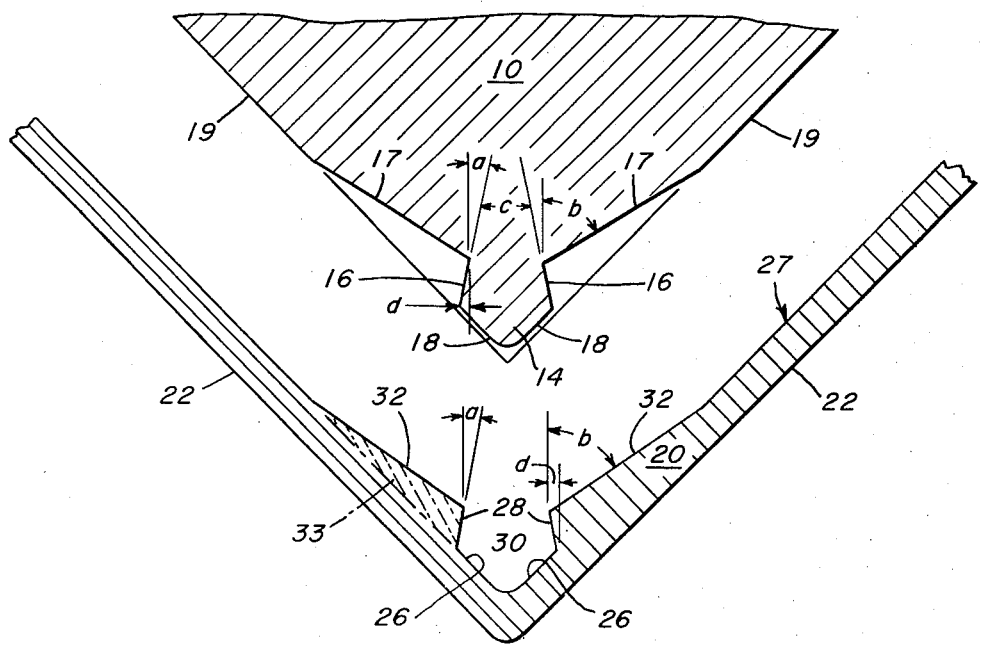
FIG. 1(a) is an enlarged detailed cross-sectional elevation of the tongue and groove shown in FIG. 1.

Referring to FIG. 1, core member 10 is substantially rectangular in cross-section having two opposite rounded corners 12 and dovetail-wedge or diamond shaped tongues 14 at the remaining opposite corners and extending the length of the core. As shown in detail in FIG. 1(a), the tongues have two diverging surfaces 16 which join the two outer converging surfaces 18 which intersect to produce a wedge on the end of the tongues 14. One preferred embodiment as shown in FIG. 1(a) contemplates an arrangement wherein the outer converging surfaces 18 of the tongue 14 are more or less coplanar with the sides 19 of the core 10. It is also preferred that the angle $a$ of divergence of surface 16 and the angle $b$ of the undercut surface 17 are 10° and 60° respectively. The included angle $c$ between diverging surfaces 16 preferably ranges from 14° to 40°. Another preferred feature is that the offset $d$, shown in FIG. 1(a), be approximately one-sixteenth inch or between one thirty-second and three thirty-seconds. This provides adequate interlock retention strength while enabling easy assembly.

Two angular elongated cladding members 20 are provided each with two legs 22 intersecting at substantially right angles as shown in FIGS. 1 and 1(a). One contemplated practice of this invention includes an arrangement in which the legs intersect at less than a right angle, for instance 85° to 88°, and thereby on engagement provide a pressure contact between the inside surfaces 27 of the legs and the side surfaces 19 of the core 10 which tends to decrease possible movement and misalignment which may occur between the members during the subsequent hot-rolling steps. On the inside of the junction of the two legs of each cladding member there is a dovetail-wedge or diamond shaped groove 30 extending longitudinally the length thereof and adapted for snap fit interlocking engagement with the tongues 14 of the core 10. The groove 30 is defined by two diverging surfaces 26 which join two converging surfaces 28. The surfaces 26 diverge to open the groove and the surfaces 28 converge to partially close the groove. One preferred embodiment of the cladding members contemplates an outwardly raised fillet wedge surface 32 on the inner side of each leg into which the groove projects. This permits diverging surfaces 26 to be more or less coplanar with the inside surface 27 of the cladding member legs.

The preferred arrangement shown particularly in FIG. 1(a) features a substantial amount of coplanarism between the outer surfaces 18 converging at the outer reaches of the tongue 14, and major sides 19 on core 10 substantially adjacent the tongue and a substantial coplanarism between the surfaces 26 diverging to open groove 30 and the inside surface 27 of cladding angle member 20. Substantial coplanarism here is not intended in a strict literal sense but rather a broad sense. The surfaces need not be parallel and can be offset by as much as one-eighth inch or by as much as 50 percent of the thickness of the cladding legs 22. In fact, it is advantageous that the surfaces 18 converging to form the wedge on the tongue 14 are offset inwardly from the planes of the sides 19. By offsetting the tongue surfaces inwardly by about one thirty-second inch with respect to surfaces 19, the tongues are provided some protection against damage in stacking core members for storage. The tongue can be viewed as provided by removing from an otherwise square corner the wedge shaped area bounded by surfaces 16 and 17. This wedge shaped undercutting or relief on both sides of the corner then provides for the dovetail-wedge tongue 14. In the preferred embodiment of FIG. 1(a), the groove 30 in cladding member 20 is provided as a recess in additional raised fillet wedge 33 over the normally straight inside surface 27, the groove 30 projecting into mainly the raised wedge 33. The raised fillet wedges 33 in the cladding angle members substantially mate with those removed from the core corner region to provide the tongue 14. That is, the surfaces 16 and 18 of the tongue 14 and associated undercut surface 17 on the core 10 substantially mate with surfaces 26 and 28 of groove 30 and associated raised fillet wedge surface 32 on the cladding 20 such that the mating surfaces are substantially coincident when the cladding is snapped onto the core to provide the composite as shown in FIG. 2.

It should be understood that this invention contemplates the use of cladding and cores of various compatible shapes, including but not limited to, a square core with angular cladding or a circular core with semicircular cladding. It should be further understood that the tongue and groove means may be interchanged, that is, the tongue means may be provided on the cladding member and the groove means on the core member. However the substantially square configuration shown in the figures where the tongue is on the core is preferred as it readily facilitates a very reliable level of performance. The dovetail wedge tongue and groove need not necessarily be of the precise configuration depicted in the drawing. What is important is that the tongue feature some wedge provision equivalent to converging surfaces 18 to permit rolling snap-fit interlocking engagement with the groove. The tongue must also feature some undercutting provision as provided by diverging surfaces 16 to facilitate interlocked engagement to prevent disengagement in the direction of the tongue. Likewise the groove has to be of such size and configuration to receive the tongue and must have some provision as the converging surfaces 28 to engage the undercut or dovetail portion of the tongue. Preferably the tongue and groove substantially mate.

Figure 4:
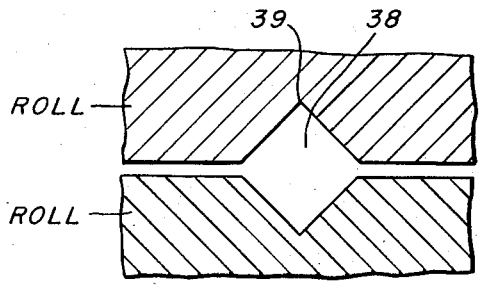
FIG. 4 is a schematic representation of rolls suited to snap fit the core and cladding members.

In practicing the improved method and referring specifically to the particular embodiment shown in the drawing, the grooves 30 of the cladding angles 20 are brought into alignment with the tongues 14 of the core 10 and the assembly is then passed through a rolling mill stand having V or diamond shaped rolls, that is, rolls which part to describe a diamond shape 38 in FIG. 4. The tongues and grooves are vertical so that compression occurs therebetween by the action of the V grooves 39 in the rolls. This snaps the tongues 14 into the grooves 30 thereby effecting interlocked engagement between the tongues and grooves and locking the cladding angles 20 to the core 10 to produce the assembly shown in FIG. 2. The snap engagement rolling is preferably performed at substantially room temperature, not over 300°F, to assure sufficient strength in the metal to facilitate a tight fit. Referring to FIG. 2, peripheral gaps 34 between opposite cladding angles allow lateral movement of the cladding metal during its compression in the first passes during subsequent hot roll bonding procedures while preventing or reducing the formation of flash when the cladding legs meet to close the cladding periphery around the core.

Figure 2:
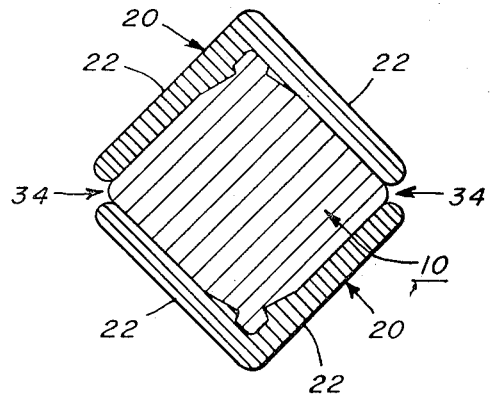
FIG. 2 is a cross-sectional elevation of the members in FIG. 1 after engagement.
Figure 3:
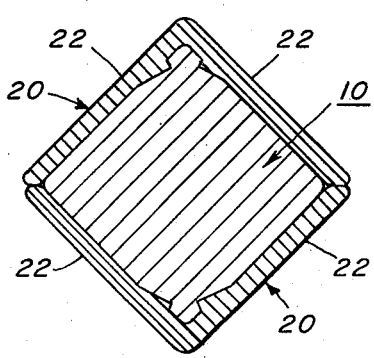
FIG. 3 is a cross-sectional elevation of the composite metal after initial roll passes.
Figure 5:
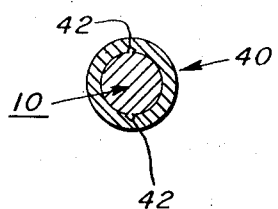
FIG. 5 is a cross-sectional elevation of a round composite rod derived from the composite metal of FIG. 3.

The interlocked core-cladding assembly shown in FIG. 2 is heated to hot roll bonding and elevated or hot rolling temperatures which typically range from 550° to 850°F for aluminum alloys. The heated assembly is passed through rolls in order to metallurgically bond the cladding and core members together by appropriate reductions as is known in the art. Diamond shaped rolls are used to apply the pressure in the direction of the tongues 14 so as to assure bonding in these critical regions. The assembly is then rotated 90° so that rolling pressure is perpendicular to the initial axis of rolling, and passed through a second set of diamond shaped rolls to further reduce the thickness of the composite body. Additional roll passes further compress the composite and move the cladding metal laterally to close the gaps 34 depicted in FIG. 2 to complete the encasement of the core 10 as shown in FIG. 3. The assembly is then subjected to a plurality of roll passes in ta continuous mill moving through roll openings, typically ovalar in shape, which gradually reduce the size of the composite and change it to a substantially circular cross-section. Referring to FIG. 5 the round rod composite 40 may bear traces of the original tongue and groove in the form of a small projection 42 on the core when examined under sufficient magnification. The composite rod 40 is referred to as redraw rod since it is typically of about three-eighths to five-eighths inch across its diameter and highly suited to drawing operations to further reduce its size. The composite rod 40 can now be annealed if desired and then drawn through a plurality of dies having progressively smaller cross sections to form a wire product.

It should be understood that the cladding and core members may be extruded, cast, machined or the like to produce the dovetail-wedge shaped tongue and groove configuration. Extrusion is often preferred especially for the cladding becuase it improves the properties of the members some, thereby favoring the engagement operation and offers certain economic advantages. The invention will be more fully understood by reference to the following specific example.

EXAMPLE

An ingot of 5056 alloy, containing nominally 5.2% magnesium, 0.10% manganese, 0.10% chromium, the balance being aluminum and incidental elements and impurities, was heated to extrusion temperature of about 510°F and extruded to form a substantially rectangular elongated core having dovetail-wedge shaped tongues on two opposite corners according to the arrangement shown in FIG. 1. An ingot of 6253 alloy, containing nominally 1.3% magnesium, 0.72% silicon, 0.25% chromium, 2.0% zinc and the balance being aluminum and incidental impurities, was then heated to extrusion temperature of about 700°F and extruded to form elongated cladding angles having a dovetail-wedge shaped groove running the length thereof as also shown in FIG. 1. The extruded core and cladding angles were cut into lengths in the neighborhood of 7 feet, aligned for engagement and fed at room temperature into a diamond shaped rolling mill which effected interlocking engagement by snapping the tongue means into the groove means. The resulting interlocked composite assembly was then heated to about 780°F and passed through a diamond shaped roll to metallurgically bond the cladding angles to the core. After the initial pass, the partially bonded composite was rotated 90°, so that the rolling pressure was perpendicular to the initial axis of rolling, and then passed through a second pass thus further metallurgically bonding the cladding angle legs to the core. The bonded composite was further subjected to four additional passes through diamond shaped rolls and then 14 passes through rolls having oval openings and then round openings, the openings in each successive pass being progressively smaller than the preceding one, resulting in a three-eighths inch diameter composite rod. The rod was then drawn through a plurality of dies, each having progressively smaller openings, into 0.0108 inch wire which upon examination showed the cladding was metallurgically bonded to the core and averaged 16 percent by volume of the total composite.

We claim:

1. A method of forming a composite metal body including the steps:
   a. providing cladding and core members with longitudinal dovetail-wedge shaped tongue and groove means adapted for snap fit rolling interlocking engagement;
   b. bringing said cladding and core member together so that said tongue and groove means are in alignment;
   c. passing said cladding and core through rollers to effect interlocking and provide an assembly comprising the core and interlocked cladding member; and
   d. hot rolling said cladding core assembly to metallurgically bond said cladding to said core to produce a composite body.

2. A method of forming a composite metal wire including the steps:
   a. providing cladding and core members with longitudinal dovetail-wedge shaped tongue and groove means adapted for snap-fit interlocking engagement;
   b. bringing said cladding and core member together so that said tongue and groove means are in alignment;
   c. passing said aligned cladding and core members through rollers to effect interlocking at substantially room temperature;
   d. hot rolling said cladding and core to bond said cladding to said core; and
   e. drawing said cladding and core through a plurality of dies having progressively smaller cross-sections.

3. The method as claimed in claim 1, wherein the core is an aluminum alloy.

4. The method as claimed in claim 1, wherein the cladding is a corrosion resistant aluminum alloy.

5. The method as claimed in claim 1, wherein the cladding and core are aluminum extrusions.

6. The method as claimed in claim 1, wherein said core is of a substantially rectangular cross-section, and said cladding is of a substantially 90° angular cross-section.

7. The method as claimed in claim 1, wherein said core is of a substantially circular cross-section, and said cladding is of a substantially semi-circular cross-section.

8. A method of forming a composite metal body including the steps:
   a. providing elongated cladding angle members of substantially right angular cross-section each of the angle legs having on its inside surface in the region of the intersection of the legs a raised fillet wedge, which fillet wedges are separated by a dovetail-wedge shaped groove having surfaces which diverge to open the groove and converge to partially close it;
   b. providing a substantially rectangular elongated core having an opposite corners a longitudinal dovetail-wedge shaped tongue which substantially mates with the grooves in said cladding members to facilitate snap fit rolling interlocking engagement with said angles;
   c. bringing said cladding and core members together so that said tongue and groove means are in alignment;
   d. passing said angles and core, substantially at room temperature, through rolling means with V grooves to effect said interlocking engagement; and
   e. hot rolling said angles and core to metallurgically bond said angles to said core to provide a composite having cladding metallurgically bonded to a core.

9. The method as claimed in claim 8, wherein the core is an aluminum alloy.

10. The method as claimed in claim 8, wherein the angles are an aluminum alloy.

11. The method according to claim 8 wherein the angle included between the legs of the cladding angle members is less than 90°.

12. The method according to claim 11 wherein said included angle is 85° to 88°.

13. THe method according to claim 8 wherein the outer converging surfaces of said tongue wedge are substantially coplanar with a major surface of said core member.

14. The method according to claim 8 wherein the diverging surfaces opening said groove are substantially coplanar with the major inside surfaces of the legs of said cladding angle members.

15. The method according to claim 8 wherein said cladding angle members are provided as extrusions.

16. The method according to claim 8 wherein said core member is provided as an extrusion.

17. The method according to claim 8 wherein the legs of the cladding angle members are of insufficient length to close the periphery of the cladding upon initial interlocking engagement in said step (d) such that a gap appears between cladding legs at corners other than those having the tongue-groove interlock.

18. The method according to claim 17 wherein said gap is closed in the initial hot rolling passes thereby enclosing the periphery of the core member in cladding.

19. The method according to claim 13 wherein said converging surfaces of said wedge or said core are substantially coplanar with a major surface of said core but are offset slightly inwardly thereof.

20. A method of forming a composite metal body including the steps:
   a. extruding cladding of a corrosion resistant aluminum alloy, said cladding being provided with a dovetail-wedge shaped groove;

b. extruding a core of substantially rectangular cross-section, said core being provided with a dovetail-wedge shaped tongue;

c. assembling said cladding around said core so that said tongues are aligned with said grooves;

d. rolling said assembly to firmly affix said tongue and groove interlocking engagement; and e. further rolling said assembly to bond said cladding to said core.

* * * * *